US007072629B2

(12) United States Patent
Fricke et al.

(10) Patent No.: US 7,072,629 B2
(45) Date of Patent: Jul. 4, 2006

(54) METHOD FOR RECORDING INFORMATION TRANSMITTED OVER A RADIO FREQUENCY

(75) Inventors: Ulrich Fricke, Nordstemmen (GB); Klaus-Dieter Dickhoff, Hildesheim (GB)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 10/221,262

(22) PCT Filed: Mar. 7, 2001

(86) PCT No.: PCT/DE01/00861

§ 371 (c)(1), (2), (4) Date: Dec. 20, 2002

(87) PCT Pub. No.: WO01/67655

PCT Pub. Date: Sep. 13, 2001

(65) Prior Publication Data

US 2003/0186661 A1 Oct. 2, 2003

(30) Foreign Application Priority Data

Mar. 8, 2000 (GB) ................................ 100 11 260

(51) Int. Cl.
*H04B 1/18* (2006.01)

(52) U.S. Cl. .............................. 455/150.1; 455/179.1; 455/184.1; 455/185.1; 455/186.1; 455/154.1; 455/227

(58) Field of Classification Search ............. 455/185.1, 455/186.1, 161.1, 161.2, 161.3, 175.1, 179.1, 455/184.1, 343.1–343.5, 227, 230, 231, 150.1, 455/154.1, 160.1, 3.01, 3.02, 3.04, 3.06
See application file for complete search history.

(56) References Cited

U.S. PATENT DOCUMENTS

| | | | | |
|---|---|---|---|---|
| 3,949,401 | A * | 4/1976 | Hegeler et al. | 455/526 |
| 5,101,510 | A * | 3/1992 | Duckeck | 455/186.1 |
| 5,483,506 | A * | 1/1996 | Yoshioka et al. | 369/7 |
| 5,513,385 | A * | 4/1996 | Tanaka | 455/228 |
| 5,577,048 | A * | 11/1996 | Kasa | 370/522 |
| 5,671,195 | A * | 9/1997 | Lee | 369/7 |
| 5,734,780 | A * | 3/1998 | Ichiura et al. | 386/46 |

(Continued)

FOREIGN PATENT DOCUMENTS

EP 0 687 081 12/1995

(Continued)

OTHER PUBLICATIONS

"Specification of the Radio Data System For VHF/FM Broadcasting", European Broadcasting Union, Brussels, Mar., 1984.

(Continued)

*Primary Examiner*—Duc M. Nguyen
(74) *Attorney, Agent, or Firm*—Kenyon & Kenyon LLP

(57) ABSTRACT

A method for recording information that is transmitted over a radio frequency, especially traffic information, in which, in a monitoring state, the receiving device is supplied with power in a clocked manner. While switched on, the receiving device is tuned to a preestablished radio frequency and the received radio frequency is monitored for the presence of an identifier designating information. In the event an information identifier is detected, the receiver is supplied with power for the duration of the identifier and the information is recorded. In response to switching on the monitoring state, the preestablished radio frequency is determined as the frequency to which a radio frequency refers that transmits no information and that was set before the monitoring state was switched on.

3 Claims, 2 Drawing Sheets

U.S. PATENT DOCUMENTS

| | | | | | |
|---|---|---|---|---|---|
| 5,857,149 A | * | 1/1999 | Suzuki | .................... | 455/186.1 |

FOREIGN PATENT DOCUMENTS

| | | | | |
|---|---|---|---|---|
| GB | 3832454 A1 | * | 6/1989 |
| GB | 2247121 A | * | 2/1992 |
| GB | 43 06 595 | | 9/1994 |
| GB | 2275849 A | * | 9/1994 |

OTHER PUBLICATIONS

DIN EN 50 067 based on the EBU specification “Specification of the Radio Data System (RDS)”.

* cited by examiner

METHOD FOR RECORDING INFORMATION TRANSMITTED OVER A RADIO FREQUENCY

FIELD OF THE INVENTION

The present invention relates to a method for recording information transmitted over a radio frequency.

BACKGROUND INFORMATION

"Specifications of the Radio Data System for VHF/FM Broadcasting," European Broadcasting Union, Brussels, March, 1984, describes a standard for transmitting supplemental information, in addition to radio program content, over a radio frequency. The supplemental information includes a program identifier, PI (Program Identification), for the unambiguous identification of a program content that is transmitted equally over one or a plurality of radio frequencies, a traffic radio identifier, TP (Traffic Program), that designates a program broadcasting traffic messages, a list of alternative frequencies, AF (Alternative Frequencies), over which the same program is transmitted as it is over a currently receiving radio frequency, and information regarding other program networks, ON (Other Networks). This supplemental information, in addition to other functions, makes possible an automatic tuning of the radio receiver to a radio frequency. The supplemental information is transmitted in so-called groups, in accordance with information to be transmitted of different types, having in each case four blocks each having 26 bits, of which 16 bits contain the actual information and the other 10 bits function for detecting and correcting errors as well as for synchronizing the receiver to the RDS signal.

In groups of the "3A" and "3B" type, or, in accordance with the standard DIN EN 50 067 based on the EBU specification—"Specification of the Radio Data System (RDS)," German version EN 50 067, 1992, German Electro-Technical Commission in DIN and VDE (DKE), Beuth Press GmbH, Berlin—, in groups of the "14A" and "14B" type, information about other networks, i.e., references to other radio station offerings, is transmitted. This information about ON (other networks), or, in the language of DIN EN 50 067, expanded information about other networks, EON (Enhanced Other Networks), includes information about the transmitting frequencies over which these other station offerings are transmitted and also includes the TP and TA information of each station's programming to which reference is made.

In car radios, for example, in devices of the Blaupunkt Works GmbH, Hildesheim, this information is used for the purpose of bringing traffic information to the user's attention even while he is listening to radio programming over which no traffic information is transmitted. For this purpose, the aforementioned apparatuses evaluate the EON information such that in the event of traffic information marked by the TA identifier is within the programming to which the EON information refers, the receiver, for the duration of the traffic information, is reset from the frequency being instantaneously received to this one, and therefore the reproduction of the traffic information is assured. After the termination of the traffic information, the receiver is once again tuned to the original radio frequency, that is not transmitting any traffic information.

In German Patent No. 43 06 595, a radio receiver is described in the form of a car radio, which has the capability of automatically recording traffic information that is designated as such by an identifier and that is transmitted over a radio frequency. The radio receiver described also possesses a monitoring operating state, in which, on the one hand, it is possible to continue recording current traffic information even after being switched off, while, on the other hand, avoiding an excessive stressing of the vehicle battery, which functions as the energy source for the radio receiver. During the monitoring state, the means necessary for receiving and evaluating a radio frequency are supplied with power in a clocked fashion, the power nevertheless completely switching off the assemblies that have especially high energy consumption, such as an NF (Low Frequency) output stage. During the monitoring state, the receiver, while the receiving evaluating means are switched on, is tuned to a preestablished radio frequency, and the received radio frequency monitors for the presence of an identifier designating traffic information. In the event an identifier is detected, the receiving, evaluating, and subsequently recording means are supplied with power for the duration of the identifier, and the information is recorded.

The radio receiver described in German Patent No. 43 06 595 assumes that, before switching the device to the monitoring state, the receiving element is set at a radio frequency over which traffic information is transmitted. If this is not the case, then in conventional car radios, for example, in the aforementioned devices of the Blaupunkt Works GmbH, Hildesheim, a TP-oriented transmitter search is initiated, i.e., a search for radio frequencies that broadcast traffic information. In the event that a plurality of TP radio frequencies is detected, the one having the clearest reception is set as the receiving frequency. The result is that, under certain circumstances, when the radio receiver is started up, transmitters that are not known to the user are stored in the traffic information storage unit, which can confuse the user. In addition, it is possible that traffic information is stored that is from a distant radio transmitter and that is irrelevant to the current location of the receiver, which adds to the confusion and also limits the storage space, usually in short supply, to the detriment of relevant traffic information.

SUMMARY

In accordance with an example method according to the present invention for recording information transmitted over a radio frequency, in a monitoring state, the means necessary for receiving and evaluating a radio frequency may be supplied with power in a clocked fashion, the receiving and evaluating means, while switched on, may be tuned to a preestablished radio frequency and the received radio frequency may be monitored for the presence of an identifier designating information. In the event an information identifier is recognized, the receiving, evaluating, and subsequently recording means may be supplied with power for the duration of the identifier and the information being recorded; the preestablished radio frequency, while the monitoring state is switched on, may be determined as the frequency to which a radio frequency refers that is not transmitting any information and that was set before the monitoring state is switched on. In the event that the user selects a radio frequency over which no traffic information is transmitted, during the monitoring operating state, i.e., when the radio receiver is switched off, traffic information of the same transmitter may be recorded in the traffic radio storage unit, just as in the switched-on operating state.

After the termination of the monitoring state, the radio frequency that was set in the receiver before the beginning of the monitoring state may once again be set. Therefore, the user may be spared having to reset the radio at the frequency actually desired, which under certain circumstances may be stressful for the user.

DETAILED DESCRIPTION

Figure 1:
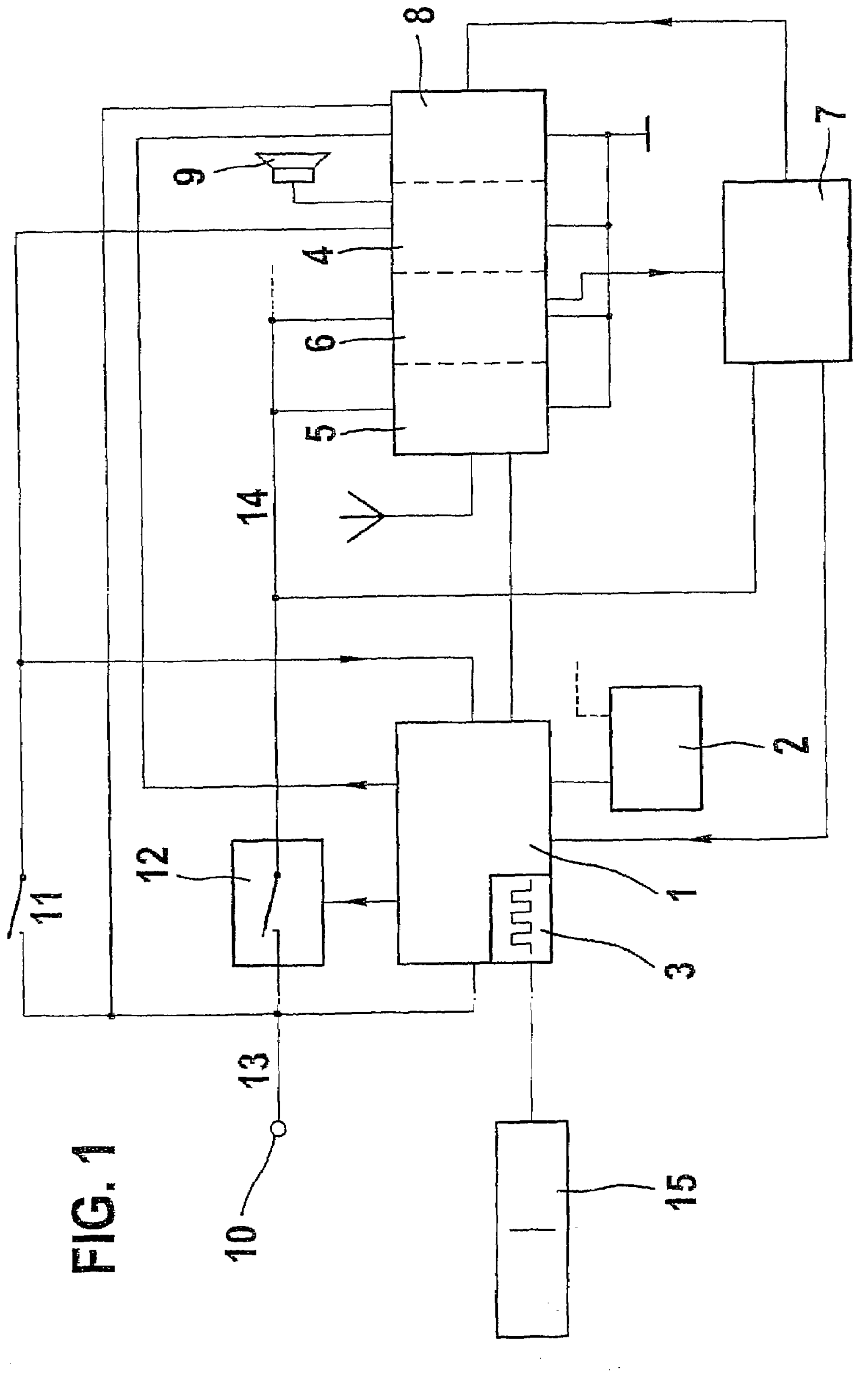
FIG. 1 illustrates a block diagram an example embodiment of a radio receiver according to the present invention.

Exemplary embodiments of a radio receiver according to the present invention are described below using the example of a car radio illustrated in FIG. 1.

A car-radio terminal 10 carrying operating voltage 13 and connected to a power source, such as the vehicle battery, may be connected to the inputs of an appliance switch 11 for switching the car radio on and off, to a controllable switch 12, and to a device control 1, which may be, for example, a computer for processing an operating program. Control unit 1, which may be connected to an operating element, may have a clock-pulse generator 3, which in a clocked manner may switch controllable switch 12 via the control unit. The output of device control 11 may be connected to control unit 1 and to the functional means that are not required for monitoring a radio frequency broadcasting traffic information, hereinafter termed TP radio frequency, and that have high energy consumption for their operation, such as NF amplifier 4, illumination means, and the like. The output of controllable switch 12 may be connected to the means that are required for monitoring a TP radio frequency, such as HF (high frequency) stage 5, ZF (intermediate frequency) stage 6, and signal decoder 7, which in the present case may be executed as a decoder for detecting TA identifiers that designate traffic information and that are transmitted as part of the RDS signal. One output of signal decoder 7, which may be connected downstream of ZF stage 6, may be connected to control unit 1, and a further output may be connected to a storage unit 8 that is provided for recording and querying traffic information.

If appliance switch 11 is closed, then operating voltage 13 may be conveyed to NF stage 4 and to control unit 1, which then closes controllable switch 12 and therefore also supplies HF stage 5, ZF stage 6, and signal decoder 7 with operating voltage 13. The car radio may therefore be switched on and may be in normal operation. If the car radio is placed in a monitoring state, in which a set radio frequency may be monitored for the transmission of traffic information, but the program received over the set radio frequency is not reproduced, then appliance switch 1 may be opened, resulting, in particular, in NF stage 4 being switched off. As a result of opening switch 11, which may be communicated to control unit 1 by the drop-off of the operating voltage at the output terminal of switch 11 assigned to it, the clock-pulse generator may be activated, which then drives controllable switch 12 such that functional means 5, 6, 7, which may be required for receiving and monitoring a radio frequency, may be furnished with operating voltage 14 in a clocked manner. If during the short switched-on phases of clocked operating voltage 14, a TA identifier in the RDS signal, characterizing traffic information, is detected by signal decoder 7, then control unit 1 may maintain controllable switch 12 in the switched-on state for the duration of the presence of the TA identifier, and it may control storage unit 8 for recording the traffic information that is transmitted over the set radio frequency. If signal decoder 7 establishes the absence of the TA identifier at the termination of the traffic information, then control unit 1, at an appropriate signal of signal decoder 7, may once again activate clock-pulse generator 3 for the clocked switching of controllable switch 12. The car radio may therefore once again be in the monitoring state, which may be interrupted or terminated by a renewed traffic radio announcement or by the closing of appliance switch 11.

Since the traffic information, on the basis of a determination, may begin roughly 1.6 seconds after the initiation of the TA identifier, the duration of pauses $T_{off}$ between two switched-on phases of the operating voltage may be selected so as to be shorter than 1.6 seconds, along the lines of maximum power savings but close to this threshold value, i.e., for example, at 1.5 seconds. At a pulse-pause or switched-off duration $T_{off}$ of 1.5 seconds and a pulse or switched-on duration $T_{on}$ of, for example, 0.5 seconds, a reduction is yielded, for example, according to the equation:

$$\frac{T_{on}}{T_{on}+T_{off}} = \frac{0.5}{0.5+1.5} = \frac{1}{4}$$

of energy use, which would be necessary for the ongoing monitoring of a radio frequency.

The traffic announcement may be separated out in a conventional manner.

In addition, control circuit 1 may be connected to a second storage unit 15, which may store a non-TP radio frequency that is set at the HF stage before the opening of appliance switch 11, as well as the TP radio frequency to which the non-TP frequency refers.

In DIN EN 50 067, so-called EON (Enhanced Other Networks) information is provided as part of the Radio Data System, information being transmitted in groups of the "14A" and "14B" type. In accordance with the cited standard, the inherently contradictory coding TP=0 (at issue is a radio frequency that is not broadcasting any traffic information) and TA=1 (traffic information is present) in the initiated program designate that although it, itself, may not be transmitting any traffic information (i.e., it is a question of a non-TP radio frequency), it may be transmitting EON information, which refers to at least one other (TP) station that broadcasts traffic information.

In this context, for example, in the case of the station NDR3 of the North German Radio, which itself may not broadcast any traffic information, it may be established on the transmitter side that reference is made to a station of this type, for example, the station NDR2 of the North German Radio, which may transmit traffic information which may be relevant to the broadcast area of the non-TP station, i.e., of NDR3.

Control unit 1 also may have a data connection to HF stage 5, via which the data of a frequency to be set may be conveyed to the tuning circuit of HF stage 5. Finally, it is possible to convey via control unit 1 to second storage unit 15 frequency data that are composed of EON data, which may be evaluated using signal decoder 7, namely the data of the TP radio frequency to which a set non-TP radio frequency refers.

Figure 2:
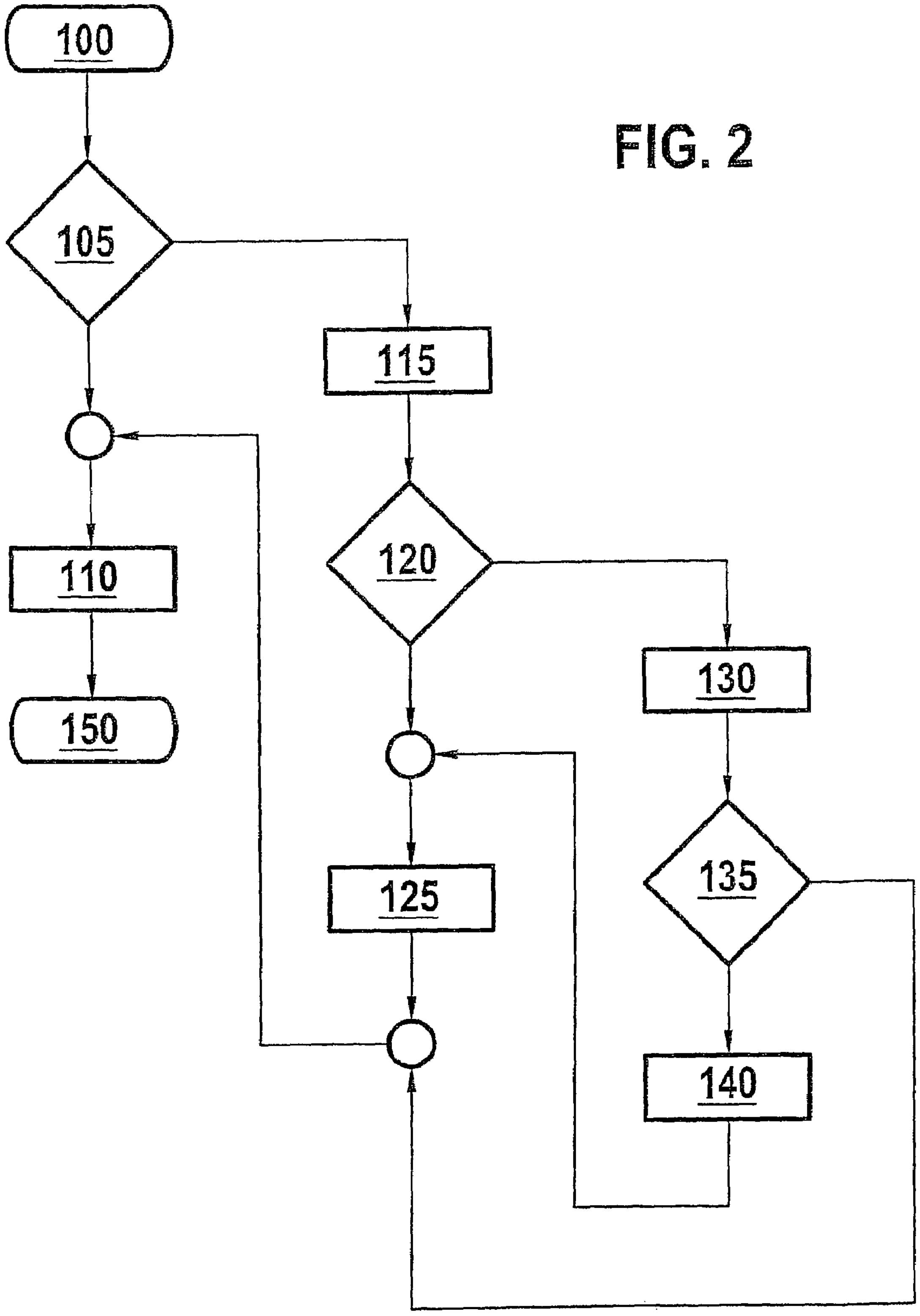
FIG. 2 shows a flowchart of an example embodiment of a method according to the present invention.

The above exemplary embodiment of a radio receiver is the basis for the exemplary method explained below in accordance with FIG. 2.

During the normal operating state, i.e., when appliance switch 11 is closed, the program signal received over a radio frequency that is set using the tuning circuit of HF stage 5 may be reproduced via the NF stage and loudspeaker 9 connected thereto. If the set radio frequency is a non-TP radio frequency, i.e., a radio frequency over which no traffic information is broadcast, then signal decoder 7 may monitor the RDS signal of the set radio frequency for EON information, i.e., for references to other radio frequencies transmitting traffic information, i.e., TP radio frequencies, and for announcement identifiers (TA) which relate to a different radio frequency of this kind. If an EON-TA identifier appears, then the radio receiver for the duration of the TA identifier may be tuned to the appropriate other radio frequency, i.e., the EON-TP radio frequency, and the transmitted traffic information may be reproduced. After the termination of the traffic information, the radio receiver may once again be tuned to the originally set non-TP radio frequency.

If, as a result of the opening of appliance switch 11, the radio receiver is placed in the described monitoring state (step 100), then a check may be run as to whether the radio receiver is tuned to a non-TP radio frequency (step 105). If no non-TP radio frequency, i.e., a TP-radio frequency, is set, then this TP radio frequency may be subsequently monitored in the manner described for the appearance of traffic information, and the traffic information, if received, may be recorded (step 110).

On the other hand, if, when the receiver is switched off, a non-TP radio frequency is set, then in second storage unit 15 a search may be conducted for a TP radio frequency that was stored with regard to the most recently set non-TP radio frequency (step 115). If in second storage unit 15 no TP radio frequency of this type is found (step 120), i.e., the most recently set non-TP radio frequency did not refer to an appropriate TD radio frequency, then a transmitter search may be initiated for the TP frequency having the clearest reception, and in the receiver the TP radio frequency may be set that has the clearest reception as determined by the search (step 125), whereupon this TP frequency may be monitored for the presence of traffic information (step 110).

If in step 120 it is determined that in second storage unit 15 the data of a TP radio frequency are stored, i.e., that the most recently set non-TP radio frequency made reference to a TP radio frequency, then the latter may be set in the receiver (step 130) and its receiving quality may be checked (step 135). If it is determined that the set TP radio frequency cannot be adequately received, then alternative frequencies of the same PI code that are available at the TP radio frequency, i.e., having the same program content, may be checked until an alternative is found that can be received (step 140), and in the event of a reception-capable alternative, this may be set as the TP radio frequency in the receiver, whereupon the sequence may be continued at step 110. In this context, the alternative frequencies may be determined both on the basis of the AF data, i.e., using the Radio Data System of transmitted lists of alternative frequencies, as well as in the context of a transmitter search checking the program identifier (PI) of the reception-capable radio frequencies. If no reception-capable alternative is found, then the receiver, in the context of a transmitter search, may determine another reception-capable TP radio frequency (step 120) and monitor it for the appearance of traffic information (step 110).

The sequence may be terminated in the start-up of the radio receiver by switching on appliance switch 11. Then, from the second storage unit, the radio frequency may be selected that was most recently set before the switching-off of the radio receiver, and this may be set in the receiver (step 150).

In the context of the present invention, radio frequencies may be monitored not only for traffic information, but generally for any type of designated information. It is also possible, through the appropriate execution of signal decoder 7, to monitor information carriers other than the radio data signal for identifiers. It is possible to monitor, for example, for an announcement identifier of the ARI (Driver Information System) system, which may also be transmitted over a radio frequency.

What is claimed is:

1. A method for recording information transmitted over a radio frequency, comprising:

supplying power, in a clocked fashion, to an arrangement configured to receive and evaluate a radio frequency;

while the arrangement configured to receive and evaluate is switched on, tuning to a preestablished radio frequency and switching the arrangement configured to receive and evaluate to a monitoring state;

monitoring the radio frequency for the presence of an identifier designating information;

in an event the identifier designating information is detected, supplying the arrangement configured to receive and evaluate, and a recording arrangement, with power for a duration of the identifier, and recording information; and in response to switching on the monitoring state, determining the preestablished radio frequency as a frequency that transmits no traffic information and that was set before the monitoring state was switched on.

2. The method according to claim 1, wherein the information is traffic information.

3. The method according to claim 1, further comprising: after the monitoring state is switched off, tuning to the frequency that was set before the monitoring state was switched on.

* * * * *